UNITED STATES PATENT OFFICE.

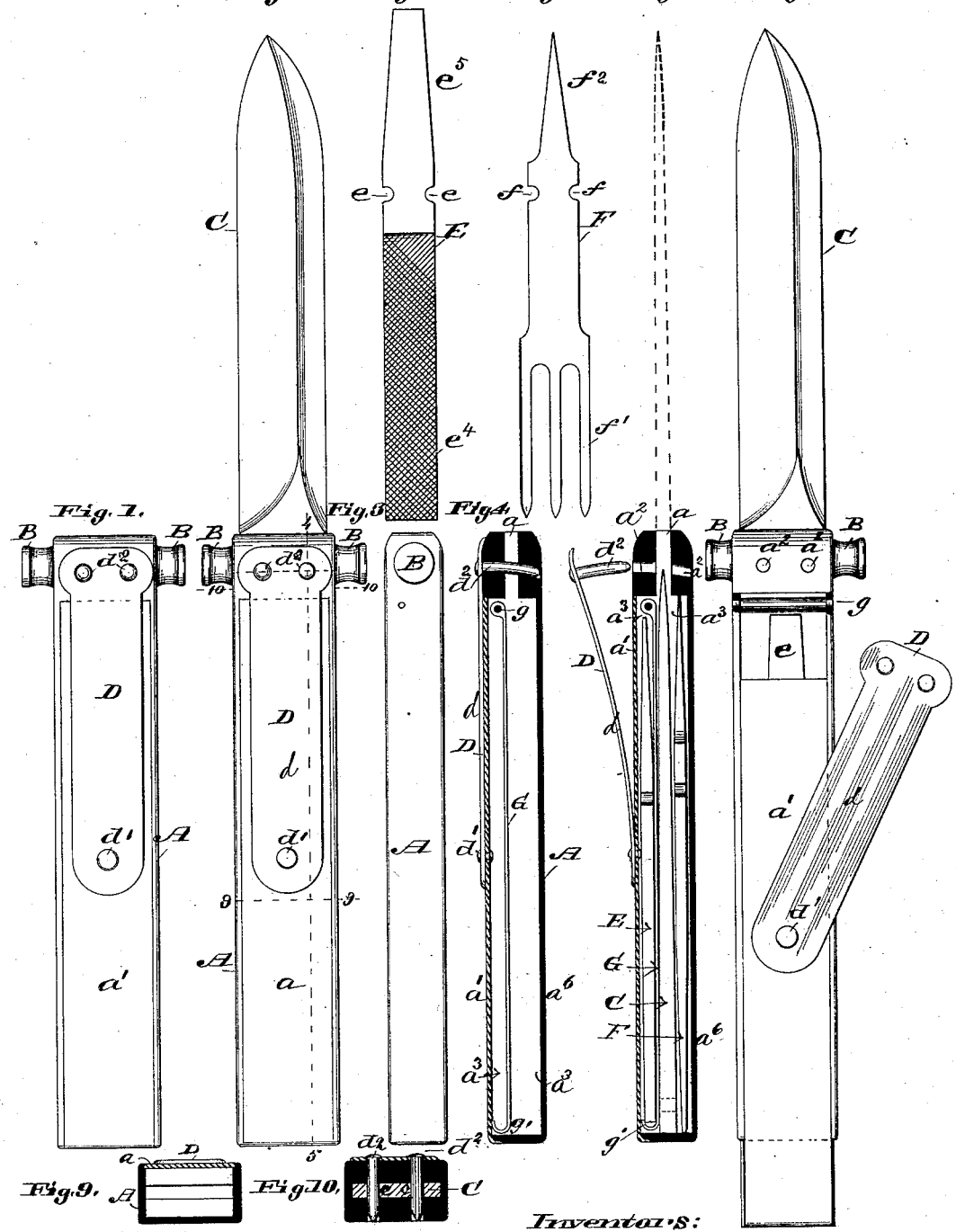

WILLIAM J. KRIZ, HENRY A. HAMMEL, AND THOMAS W. McMANUS, OF ST. LOUIS, MISSOURI.

COMBINATION-TOOL.

SPECIFICATION forming part of Letters Patent No. 315,148, dated April 7, 1885.

Application filed August 4, 1884. (No model.)

*To all whom it may concern:*

Be it known that we, WILLIAM J. KRIZ, HENRY A. HAMMEL, and THOMAS WARD MC-MANUS, all of St. Louis, Missouri, have made a new and useful Improvement in Combination-Tools, of which the following is a full, clear, and exact description, reference being had to the annexed drawings, making part of this specification, in which—

Figure 1 is a side elevation of the tool closed, and as when used as a hammer; Fig. 2, a side elevation showing the blade drawn out, as when the tool is used as a knife; Fig. 3, an edge elevation of the tool closed, as in Fig. 1; Fig. 4, a section on the line 4 4 of Fig. 2, the blade and other movable parts which are adapted to be inclosed in the handle being removed therefrom; Fig. 5, a section similar to that of Fig. 4, but showing the movable parts in their respective places within the handle, the spring-holder used in holding the various movable parts properly in the handle being sprung out laterally from the handle, and the position of the various tools when in use being indicated by the broken lines; Fig. 6, a side elevation similar to that of Fig. 2, but showing the holder loosened and turned partly around on its pivot, and the slide, which constitutes one of the sides of the handle, being partly withdrawn from its place in the handle; Fig. 7, a side elevation of the combined file and screw-driver, being one of the tools adapted to be inclosed in the handle and to be used interchangeably with the other tools; Fig. 8, a side elevation of the combined fork and pick, being another of the tools used interchangeably in the handle; Fig. 9, a cross-section on the line 9 9 of Fig. 2, and Fig. 10 a cross-section on the line 10 10 of Fig. 2.

The same letters of reference denote the same parts.

The present invention, which is especially useful to hunters, sportsmen, and others requiring a compact combination-tool adapted to a variety of purposes, is a combined hammer, knife, file, screw-driver, fork, and pick.

A represents a casing, which is a receptacle for the various tools (other than the hammer) when not in use, and a handle for them when in use. The projections B B at each side of the casing, at its outer end, enables the tool to be used as a hammer. These projections also constitute a guard for the hand when the tool is used for other purposes.

To form the tool into a knife, a blade, C, which, when not in use, is within the handle, as shown in Fig. 5, is slipped longitudinally outward through the opening $a$ in the outer end of the casing A, into the position shown in Figs. 2, 6. The blade is conveniently secured in either of its positions by means of the holder D, which consists, substantially, of the spring-plate $d$, which is pivoted or fastened at $d'$ to the side $a'$ of the handle, and provided with the pins $d^2$ $d^2$, which are adapted, when the holder is adjusted to hold the blade, to pass through perforations $a^2$ $a^2$ in the handle, as shown in Fig. 4.

When the blade is in use, as in Fig. 1, the pins pass also through perforations $c$ $c$ in the blade, as shown in Fig. 10, and when the blade is not in use the pins pass through the opening $a$ without the point of the blade, and thus serve as a guard to confine the blade within the handle. The various positions of the holder shown in Figs. 4, 5, 6, respectively, indicate the manner of operating the holder. There is a space, $a^3$, within the handle at each side of the blade. One of these spaces contains the combined file and screw-driver E, Figs. 5, 6, 7, and in the other of the spaces is the combined fork and pick F, Figs. 5, 8.

Either of the tools can be inserted in the opening $a$ in the handle and either end outward, and be secured in such position by means of the holder D, whose pins $d^2$ $d^2$ pass through the notches or perforations $e$ $e$ or $f$ $f$, respectively—that is, either the file end $e^4$ or the screw-driver end $e^5$ of the tool E can project outward, as well as either the fork end $f'$ or the pick end $f^2$ of the tool F; also, if desired, the fork can be used in one hand and the implement as a knife in the other hand.

To reach the tool E, the side $a'$ of the handle is made removable in the manner indicated in Fig. 6. By loosening the holder D and withdrawing the side $a'$ the tool E can be taken from its place within the handle. A partition, G, hinged at $g$ in the handle, may be used to separate the tool E from the blade B. When the other tool F is needed, the partition is turned outward on its pivot $g$ and the blade allowed to drop out of the way, whereupon the tool F can be got at. The partition is provided at its free end with a flange, $g'$, to enable that end of the partition to be readily grasped and drawn outward from the interior of the handle. If desired, a similar partition can be used upon the opposite side of the blade. The opposite side, $a^6$, of the blade may also be made removable, similar to the side $a'$.

We claim—

1. The combination, with a hollow handle, A, of a pivoted partition, G, and a removable slide, $a'$, substantially as described.

2. The combination of the hollow handle A, the removable slide $a'$, the perforations $a^2$, opening $a$, the holder D, having pins $d^2$, a hammer, B, and a tool adapted to receive said pins $d^2$ and be held in the handle by them, substantially as described.

Witness our hands.

WILLIAM J. KRIZ.
HENRY A. HAMMEL.
THOMAS W. McMANUS.

Witnesses:
CHARLES D. MOODY,
SIM. T. PRICE.